United States Patent [19]

Bradley et al.

[11] Patent Number: 5,558,042
[45] Date of Patent: Sep. 24, 1996

[54] AQUACULTURE FILTRATION SYSTEM EMPLOYING A ROTATING DRUM FILTER

[76] Inventors: James E. Bradley, R.R. 2, Box 342, Ladoga, Ind. 47954; Duane C. Leach, 820 Palmetto Ct., Indianapolis, Ind. 46217

[21] Appl. No.: 252,257

[22] Filed: Jun. 1, 1994

[51] Int. Cl.$^6$ .................................................. A01K 63/04
[52] U.S. Cl. .......................... 119/226; 210/391; 210/402; 210/407
[58] Field of Search ..................................... 210/391, 402, 210/403, 404, 407, 408, 409, 416.1, 472, 490; 119/226, 227

[56] References Cited

U.S. PATENT DOCUMENTS

| | | | |
|---|---|---|---|
| 5,213,685 | 5/1993 | Padovan | 210/402 |
| 5,300,225 | 4/1994 | Fischer | 210/391 |

OTHER PUBLICATIONS

Publication entitled "New Vacuum Cleaned Micro Strainer VCMS-4" of Harry C. Fischer, Publication Date Unknown.

*Primary Examiner*—Robert J. Popovics
*Attorney, Agent, or Firm*—Brinks Hofer Gilson & Lione

[57] ABSTRACT

An aquaculture system is provided for filtering water and includes a filter rotatably carried in a container for receiving water to be filtered. The filter includes a porous resilient filter screen forming an outer layer of the filter for removing particulate from water passing through the filter screen. A vacuum cleaning device is positioned in direct contact with the resilient filter screen for removing particulate collected at the outer surface of the resilient filter screen. A water nozzle supplies a stream of water to the resilient filter screen to remove particulate therefrom not previously removed by the vacuum cleaning device. A rotation device is coupled to the filter to rotate the filter in the container.

15 Claims, 5 Drawing Sheets

AQUACULTURE FILTRATION SYSTEM EMPLOYING A ROTATING DRUM FILTER

FIELD OF THE INVENTION

The present invention relates generally to a water filtration system; and, more particularly, to a water filtration system for aquaculture systems.

BACKGROUND OF THE INVENTION

Over the years, many of the traditional sources for fish, i.e. lakes, rivers, streams, etc., have become contaminated with pollutants generated by the public. As a result, fewer fish are available in such sources; and, in addition, fish that are able to survive in the contaminated waters often themselves become contaminated and unfit for human consumption.

The reduced supply of consumable fish from natural sources has resulted in substantial interest and growth of aquaculture systems, in which fish suitable for human consumption are raised in a contaminate-free, non-natural environment.

Aquaculture systems typically include a container containing a large quantity of water in which the fish are raised, and a filtration system for cleaning the water in the container. Such filtration systems typically include a particulate filter and a bio-filter. The particulate filter is used to remove solid particulate materials, such as fish waste and uneaten food, from the water. The bio-filter contains bacteria which removes ammonia and nitrates from the water, and also is used to oxygenate the water.

Various types of filters have been used as particulate filters in aquaculture, including rotating drum filters. The use of rotating drum filters in aquaculture, however, has been limited by their high cost, their need for frequent maintenance, and the difficulty in cleaning the filtering surface of the filtering media. The filtering surface must be continuously cleaned to prevent the filtering surface from being clogged by the particulate matter. Early rotating drum filter systems used high pressure water jets to clean the filtering surface. Such, cleaning methods, however, required the consumption of a large volume of water which had to be disposed of in an environmentally safe manner. More recent drum filter systems use vacuum cleaning devices for removing the particulate from the rotating drum on a continuous basis.

One known prior art rotating drum filter includes a rotating drum positioned in a filter container with an axis of the drum orientated diagonally with respect to the surface of the water in the container. Water flows into the container and travels through the filtering screen of the drum and out an outlet in the container. As the drum filter is rotated, a vacuum positioned in close proximity to the filter screen removes particulates lying on top of the surface of the screen and transports them by air to a separator tank where the particulate matter is separated from the main vacuum air flow.

Such known prior art system includes a 100 mesh nylon filter screen attached to the rotating drum for receiving the flow of water to be filtered. To prevent wear of the filter screen, a polypropylene screen 0.045 inches thick is interposed between the filter screen and the vacuum head. Thus, the vacuum head does not ride directly on the filter screen. Such a system has a water filtration capacity of about 200 gallons per minute.

By positioning the filter diagonally in the container, the width of the filter's surface is restricted to less than half of the overall width of the filter container. Furthermore, since the prior art system places a plastic screen over the filtering material, the vacuum head does not come in contact with the filter surface, and thus, requires a vacuum which generates sufficient suction to remove particles from the filter surface without contacting the filter surface.

SUMMARY OF THE INVENTION

The present invention provides an improved water filtration system for aquaculture and other applications. The water filtration system according to the invention includes a container having an inlet for receiving water to be filtered and an outlet for supplying filtered water, and a filter rotatably carried in the container. The filter includes a porous resilient filter screen which forms an outer layer of the filter for removing particulate from the inlet water. A cleaning device is positioned in direct contact with the resilient filter screen for removing particulate collected at an outer surface of the resilient filter screen, and a rotation device provides motive force for rotating the filter.

The filter, according to a presently preferred embodiment, includes a rigid cylindrical frame having two substantially closed end portions and a substantially open porous circumferential portion extending between the end portions. The substantially closed end portions each have an opening along an axis extending through the cylindrical frame. A tubular member extends through the opening in each of the end portions and is fixedly mounted to the container for rotatably carrying the rigid cylindrical frame. The tubular member has a slot formed therein for receiving a flow of filtered water, the filtered water flowing through the tubular member and flowing out of the tubular member from at least one end of the tubular member. A porous flexible support layer is interposed between the porous resilient filter screen and the substantially open porous circumferential portion of the cylindrical frame for allowing the resilient filter screen to flex at a location where the cleaning device contacts the outer surface of the resilient filter screen.

Preferably, the porous resilient filter screen comprises a non-corroding material, such as for example, stainless steel, having openings whose size is dependent upon the size of the particulate which is to be removed from the water. Also, it is preferred that the frame be manufactured from a non-corroding material. In addition, it is preferred that the tubular member be positioned horizontally in the container with the slot of the tubular member facing toward the bottom of the container.

The filter according to the presently preferred embodiment further includes a plurality of ultrahigh molecular weight plastic bushings, wherein one of the plurality of bushings is mounted to a corresponding end portion of the cylindrical frame. The bushings are in rotatable contact with an outer surface of the tubular member. The filter further includes a plurality of pliable seals, wherein one of the plurality of pliable seals is positioned adjacent an outer surface of a corresponding one of the plurality of bushings. The filter also includes a retainer device, including a plurality of retainers wherein one of the plurality of retainers is positioned adjacent to a corresponding one of the seals, for applying pressure to each seal to cause a deformation of the seal to form a sealing relationship between each bushing and the retainer and further forming a sealing surface on the seal which is in sealing contact with the outer surface of the tubular member.

The cleaning device preferably includes a vacuum source; a container having an upper portion coupled to the vacuum source and having a frustoconical base which extends toward an outlet; a vacuum head coupled to the container via a suction conduit, the vacuum head being held in direct contact with the resilient filter screen by a spring force exerted on the head by the conduit; and a sediment collection device coupled to the outlet of the container for collecting the removed particulate.

Most preferably, the vacuum head comprises a hollow body coupled to an ultrahigh molecular weight plastic member having an elongated slot having a length substantially equal to a width of the resilient filter screen.

In preferred embodiments, the cleaning device further includes a water nozzle for supplying a stream of water to the resilient filter screen to remove particulate therefrom not previously removed by the vacuum head.

The sediment collection device preferably includes a first conduit coupled at a first end to the outlet in the base of the container; a second conduit having a substantially horizontal portion coupled in a mid-region thereof to a second end of the first conduit, a substantial portion of the removed particulate settling in the second conduit; a third conduit having a first end coupled to a first end of the second conduit, the third conduit extending upwardly from the second conduit to a second end of the third conduit, the second end of the third conduit being covered with a first removable cap; and a forth conduit coupled to a second end of the second conduit and extending upwardly a distance therefrom, and then extending downwardly to form a drain outlet, wherein a water level in the first conduit is dependent upon the length of the distance. The upper portion of the container includes a cleaning port covered by a second removable cap.

A method for flushing the cleaning device of the invention includes the steps of removing the second cap; introducing a flow of water into the cleaning port of the container to flush any particulate in the container into the first conduit; reinstalling the second cap; removing the first cap; and introducing a flow of water into the second end of the third conduit to force particulate matter settled in the second conduit out the drain outlet of the fourth conduit.

The rotating device of the system preferably includes a motor having a rotatable shaft and a drive wheel coupled to the shaft. The drive wheel is held in driving contact with the outer surface of the resilient filter screen for transmitting a motive force generated by the motor to the filter to cause a rotation thereof.

Although the invention is described above as a part of a complete system, certain aspects of the invention may be practiced separately from other aspects of the invention.

For example, one aspect of the invention relates to a water filter which includes a rigid cylindrical frame having two substantially closed end portions and a substantially open porous circumferential portion, the substantially closed end portions each having an opening along an axis of the cylindrical frame; a porous resilient filter screen positioned over the substantially open porous circumferential portion of the cylindrical frame for forming an outer layer of the filter for removing particulate from water; and a porous flexible support layer interposed between the porous resilient filter screen and the substantially open porous circumferential portion of the cylindrical frame to allow the resilient filter screen to flex when a force is applied to the outer surface of the resilient filter screen.

Preferably, the rigid cylindrical frame is manufactured from a rigid plastic material, and the pores in the porous circumferential portion form openings sized so as not to substantially impede water flow and yet provide structural rigidity. The porous resilient filter screen preferably is a stainless steel screen having a mesh whose opening size is dependent upon the size of the particulate which is to be removed from the water. The porous flexible support layer is a resilient non-corroding material.

The filter further includes a tubular member extending through each opening in each of the end portions, the tubular member being fixedly mounted to the container for rotatably carrying the rigid cylindrical frame. A slot is formed in the tubular member for receiving a flow of filtered water, and the filtered water then flows through the tubular member and flows out of the tubular member at least one end of the tubular member.

The filter further includes a plurality of ultrahigh molecular weight plastic bushings, wherein one of the plurality of bushings is mounted to a corresponding end portion of the cylindrical frame. The bushings are in rotatable contact with the an outer surface of the tubular member. The filter further includes a plurality of pliable seals, wherein one of the plurality of pliable seals is positioned adjacent an outer surface of a corresponding one of the plurality of bushings; and a retainer device, including a plurality of retainers wherein one of the plurality of retainers is positioned adjacent to a corresponding one of the seals, for applying pressure to each the seal to cause a deformation of the seal to form a sealing relationship between each bushing and the retainer. The deformation of the seal further forms a sealing surface on the seal which is in sealing contact with the outer surface of the tubular member.

Another aspect of the invention relates to an apparatus for cleaning a filter, including a vacuum source; a container having an upper portion coupled to the vacuum source, and having a frustoconical base which extends toward an outlet; a vacuum head coupled to the container via a suction conduit, the vacuum head being held in direct contact with the resilient filter screen by a spring force exerted on the head by the suction conduit; and a sediment collection device coupled to the outlet of the container for collecting the removed particulate. The upper portion of the container includes a cleaning port covered by a removable cap.

The vacuum head includes a hollow body coupled to an ultrahigh molecular weight plastic member which includes an elongated slot with the elongation of the slot having a length substantially equal to a width of the resilient filter screen.

The sediment collection device includes a first conduit coupled at a first end to the outlet formed in the base of the container; a second conduit having a substantially horizontal portion coupled in a mid-region thereof to a second end of the first conduit, a substantial portion of the removed particulate settling in the second conduit; a third conduit having a first end coupled to a first end of the second conduit, the third conduit extending upwardly from the second conduit to a second end of the third conduit, the second end of the third conduit being covered with a first removable cap; and a forth conduit coupled to a second end of the second conduit and extending upwardly a distance therefrom, and then extending downwardly to form a drain outlet, wherein a water level in the first conduit is dependent upon the length of the distance.

A method for the cleaning the apparatus for cleaning a filter includes the steps of removing the second cap; introducing a flow of water into the cleaning port of the container to flush any particulate in the container into the first conduit;

reinstalling the second cap; removing the first cap; and introducing a flow of water into the second end of the third conduit to force particulate matter settled in the second conduit out the drain outlet of the fourth conduit.

Other features and advantages of the invention will become apparent from the drawings and detailed description of the invention that follow.

DETAILED DESCRIPTION OF PREFERRED EMBODIMENTS

Figure 1:
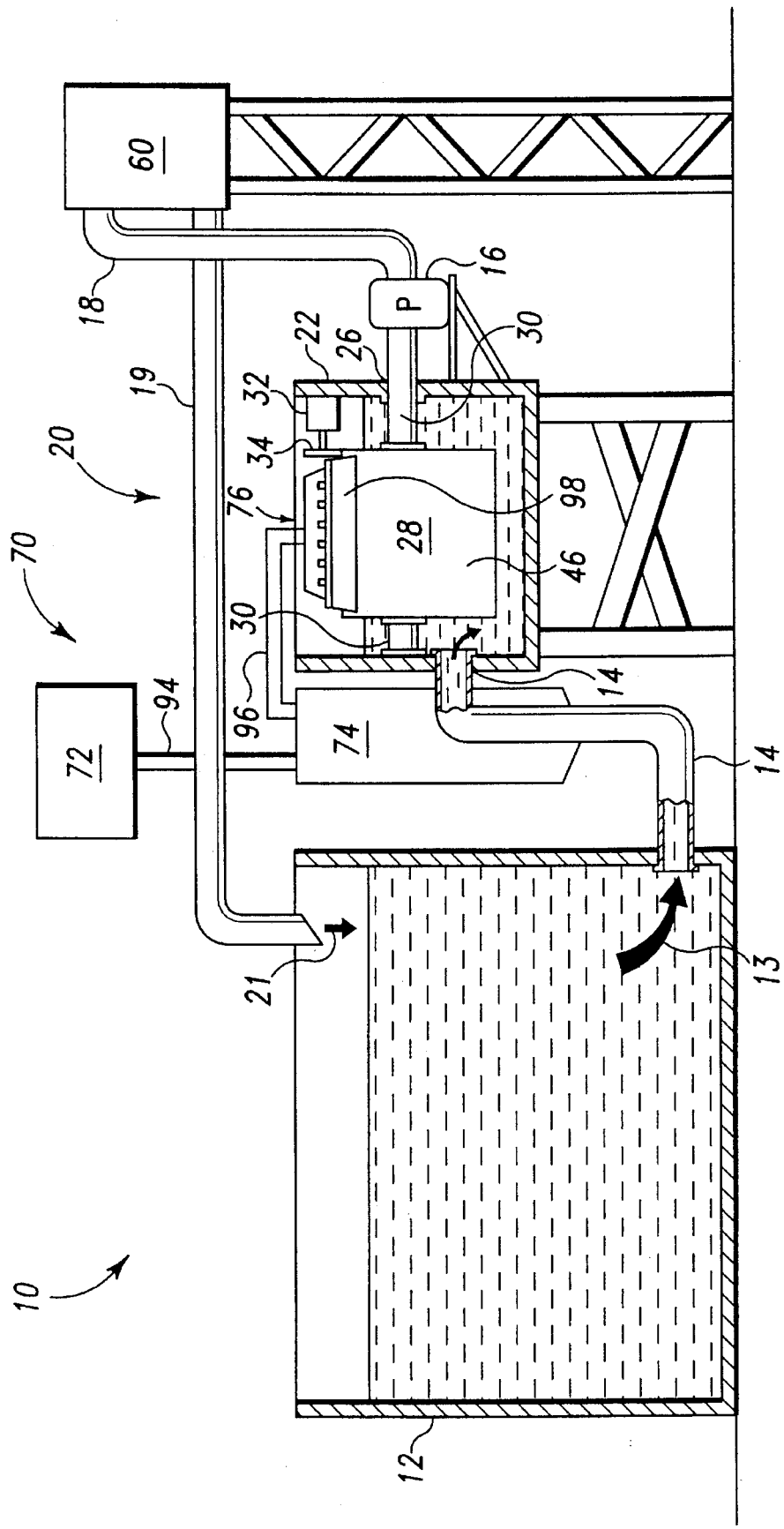
FIG. 1 is a side view of a water filtration system of the invention with a portion sectioned away for clarity.

FIG. 1 shows an aquaculture system 10 embodying the invention. Aquaculture system 10 includes a holding tank 12, a particulate filter system 20, a bacteria filter system 60, and a filter cleaning system 70.

Holding tank 12 contains a large quantity of water, for example, about 1,200 gallons, in which fish can be raised from fingerlings to a size in which they are ultimately harvested. Since the fish are continuously held in holding tank 12, the water must be continuously filtered and oxygenated to maintain a habitat conducive to the health and well-being of the fish. Holding tank 12 is coupled to particulate filter system 20 by a conduit 14 which is coupled to holding tank 12 near the bottom thereof. Conduit 14 then extends upwardly to a lower portion of a container 22 of particulate filter system 20. Thus, water flows from holding tank 12, as shown generally by arrow 13, through conduit 14 and into particulate filter system 20. Since the water is received into particulate filter system 20 via gravity feed, the water level in holding tank 12 is substantially equal to the water level in container 22 of particulate filter system 20. The filtered water from particulate filter system 20 is then supplied via a pump 16 and via a conduit 18 to bio-filter system 60, which is of a construction known in the art. Bio-filter 60 contains bacteria which removes ammonia and nitrates from the water, and oxygenates the water by passing the water through a plurality of small diameter vertical tubes. The water having passed through bio-filter system 60 is then supplied via conduit 19 by gravity feed back into holding tank 12, as shown generally by arrow 21. Thus, the water in holding tank 12 is continuously circulated through the particulate filter system 20 and bio-filter system 60 to remove particulate, ammonia and nitrates from the water. Aquaculture system 10 can recycle the 1200 gallons of water in holding tank 12 about every 15 minutes.

During the filtering process, particulate filter system 20 is continuously cleaned by filter cleaning system 70, which removes particulate from the filtering screen 46 of particulate filter system 20.

Particulate filter system 20 includes container 22 having an inlet 24 for receiving water from holding tank 12, and having an outlet 26 for supplying filtered water to the system. Particulate filter system 20 further includes a rotatable cylindrical filter drum 28 which is rotatably carried in the container 22 by a tubular member 30 which extends through substantially closed end portions of filter drum 28.

Tubular member 30 is fixedly and sealably mounted to container 22 such that tubular member 30 is held in a stationary relationship with container 22, and carries rotatable filter drum 28. A rotational motive force is supplied to filter drum 28 to rotate filter drum 28 by a motor 32 mounted in close proximity to filter drum 28. Coupled to the shaft of motor 32 is a drive wheel 34. Drive wheel 34 is held in driving contact with the outer surface of rotatable filter drum 28 to apply a rotational motive force to filter drum 28 to cause a rotation thereof. Therefore, when motor 32 is energized, drive wheel 34 rotates in conjunction with the shaft of motor 32 and, in turn, filter drum 28 is driven into rotation around tubular member 30.

Figure 2:
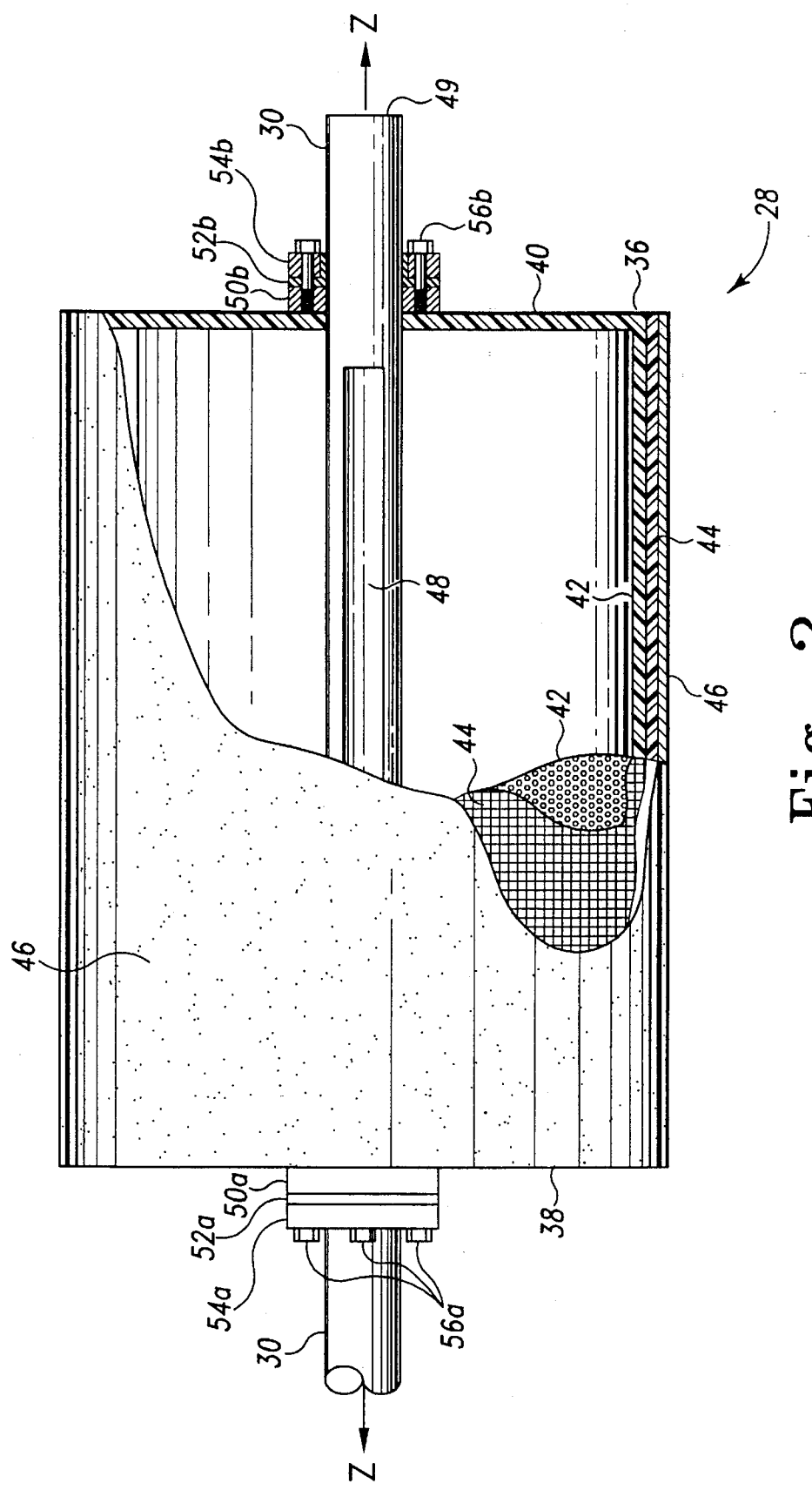
FIG. 2 is a more detailed view of the rotatable filter shown in FIG. 1, having a portion removed to more clearly show the construction of the filter.
Figure 3:
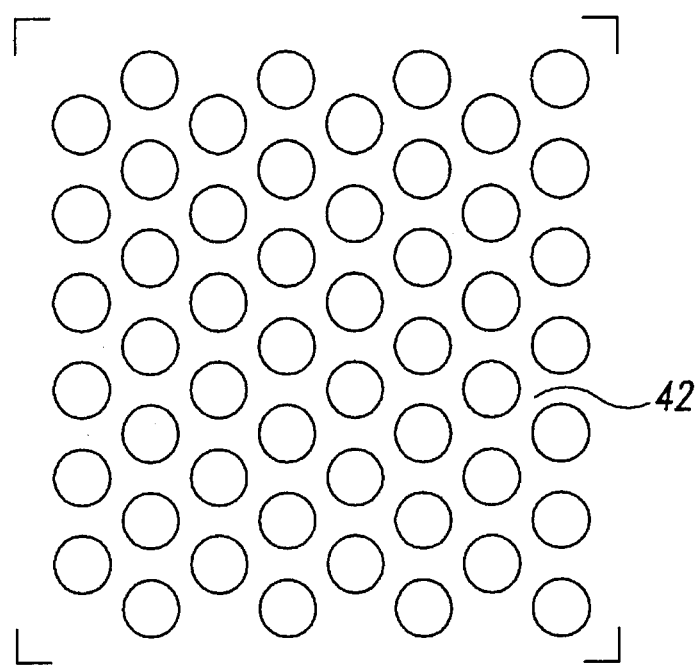
FIG. 3 is an enlargement of a portion of the porous circumferential portion of the rotatable filter shown in FIG. 2.

As shown in FIG. 2, rotatable filter drum 28 includes a rigid cylindrical frame 36 having two substantially closed circular end portions 38, 40 and a substantially open porous circumferential portion 42. The porous nature of the circumferential portion 42 can be more clearly seen in FIG. 3. The pores in circumferential portion 42 are sized so as not to substantially impede water flow and yet still provide structural rigidity, and can be, for example, pores forming openings between about ten percent and ninety percent of the circumferential area of circumferential portion 42.

Figure 4:
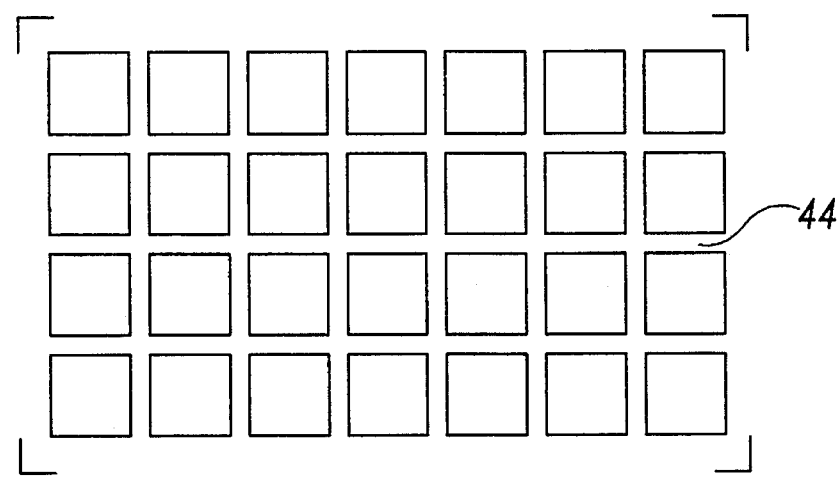
FIG. 4 is an enlargement of a portion of the porous flexible support layer shown in FIG. 2.

As shown in FIG. 2, surrounding porous circumferential portion 42 is a porous flexible support layer 44 and a porous resilient filter screen 46. Flexible support layer 44 is interposed between resilient filter screen 46 and porous circumferential portion 42 to allow the resilient filter screen 46 to flex at a location where filter cleaning system 70 contacts an outer surface of the resilient filter screen 46. The porous nature of flexible support layer 44 can be more clearly seen in FIG. 4. The pores of flexible support layer 44 are sized so as not to impede water flow and yet provide adequate support for resilient filter screen 46.

Preferably, tubular member 30 is manufactured from a non-corroding rigid material, such as, for example, stainless steel or PVC plastic. Preferably, cylindrical frame 36 is manufactured from a non-corroding material, including, for example, hard plastic materials such as polypropylene or the like. Also, preferably, porous flexible support layer 44 is made from a resilient non-corroding material, such as, for example, polypropylene, polyethylene, or any plastic, or other non-corroding material. In addition, resilient filter screen 46 is preferably made from a non-corrosive material such as, for example, stainless steel, nylon, or the like.

In the preferred embodiment shown in FIGS. 1 and 2, circumferential portion 42 of cylindrical frame 36 has pores of about five-sixteenth's of an inch in diameter. Flexible support layer 44 has pores forming substantially square openings which preferably, are in a range of about one-quarter of an inch to about one-half inch in length and width. Also, resilient filter screen 46 is a stainless steel screen having openings preferably ranging between about 50–150 microns; however, the exact size of the openings in resilient filter screen 46 will be dependent upon the size of the particulate which is to be removed from the water.

As shown in FIG. 2, tubular member 30 extends through an opening in each of the end portions 38, 40, wherein each opening is centrally located in the respective end portion and wherein an axis, Z, extends through a center-point of each opening. Tubular member 30 includes an elongated slot 48 formed therein for receiving a flow of filtered water. Elongated slot 48 provides an opening sufficient in size so as not to impede water flow, and yet provides the desired axial rigidity. Preferably, slot 48 does not extend more than half-way around the circumference of the tubular member. The filtered water which flows through tubular member 30 through slot 48 is then transported by tubular member 30 to an outlet 49 of tubular member 30 which, as shown in FIG. 1, is coupled to pump 16. Preferably, tubular member 30 is positioned in container 22 with slot 48 of tubular member 30 facing toward the bottom of container 22 such that the Z-axis extending through filter drum 28 is orientated substantially horizontally.

As also shown in FIG. 2, rotatable filter drum 28 further includes a pair of bushings 50a and 50b, preferably made from ultrahigh molecular weight (UHMW) plastic. Each of the pair of bushings 50a, 50b is mounted to a corresponding end portion 38, 40, respectively, of cylindrical frame 36. Bushings 50a, 50b are positioned adjacent to corresponding end portions 38, 40. Bushings 50a, 50b are in rotatable contact with an outer surface of tubular member 30. Positioned adjacent bearings 50a and 50b, are pliable seals 52a and 52b, respectively. Positioned adjacent to pliable seals 52a and 52b are retainer rings 54a and 54b, respectively. Retainer ring 54a, pliable seal 52a, and UHMW plastic bushing 50a each include a plurality of corresponding holes for receiving bolts 56a. Left end portion 38 of cylindrical frame 36, in turn, has a plurality of corresponding threaded holes for receiving a threaded portion of bolts 56a. Likewise, retainer ring 54b, pliable seal 52b and UHMW plastic bushing 50b each include a plurality of corresponding holes for receiving bolts 56b. Right end portion 40 of cylindrical frame 36 has a corresponding plurality of threaded holes for receiving the threaded end portions of bolts 56b. Preferably, bolts 56a, 56b are manufactured from a non-corrosive material such as stainless steel. As bolts 56a, 56b are tightened, retainer rings 54a and 54b apply pressure to pliable seals 52a and 52b, respectively, causing a deformation of each pliable seal 52a, 52b to form a sealing relationship between bushing 50a and retainer ring 54a, and between bushing 50b and retainer ring 54b, and to form a sealing surface in each seal 52a, 52b which is in sealing contact with the outer surface of tubular member 30. Thus, referring back to FIG. 1 and in view of FIG. 2, seals 52a and 52b prevent unfiltered water in container 22 from entering slot 48 of tubular member 30.

Figure 5:
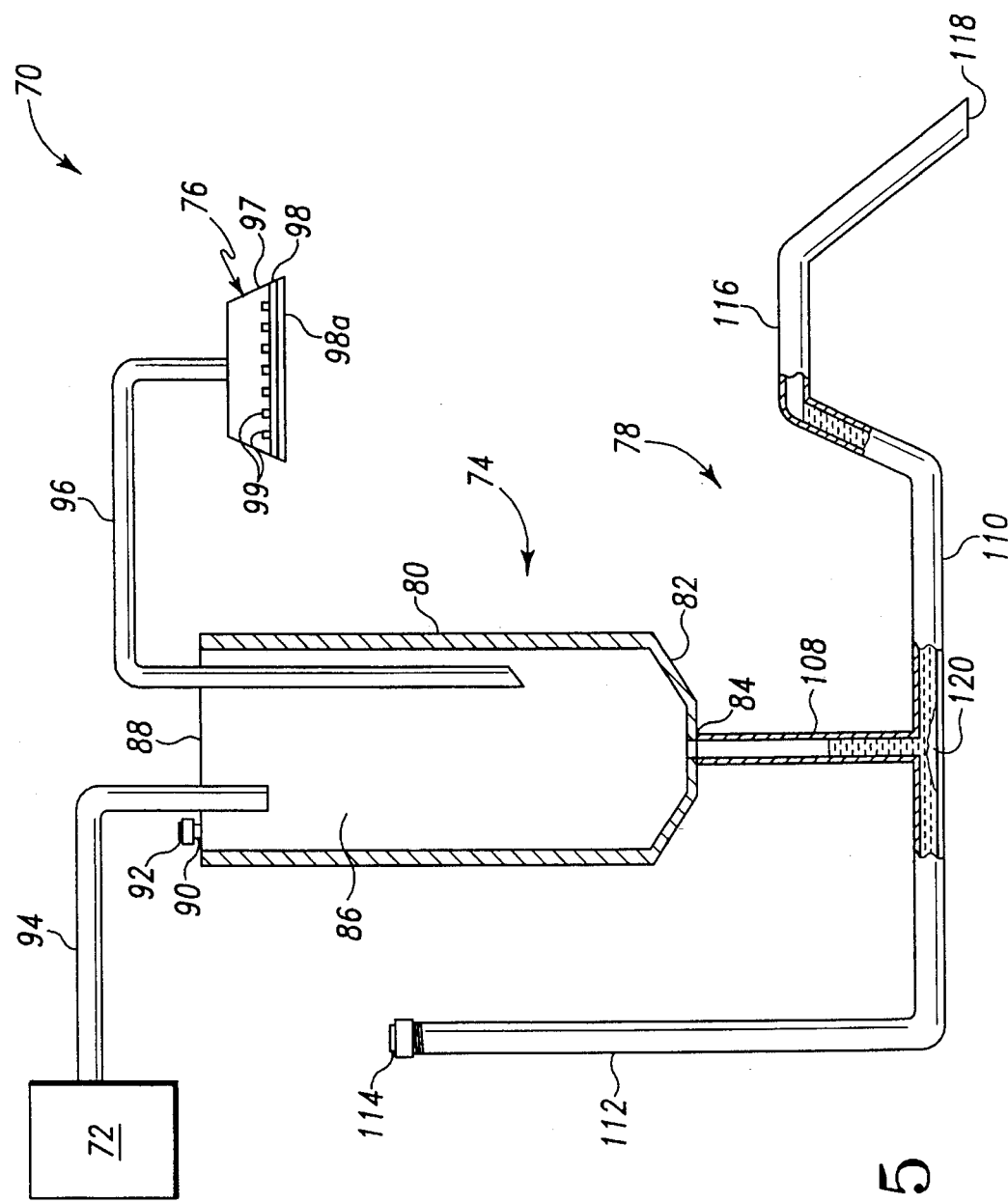
FIG. 5 is a more detailed side view of the filter cleaning apparatus of the invention.

FIG. 5 shows filter cleaning system 70 including a vacuum source 72, a vacuum chamber 74, a vacuum head 76 and a sediment collection device 78. Vacuum chamber 74 preferably is a substantially closed container having a cylindrical side-wall 80 and a frustoconical base 82 which extends inwardly and downwardly toward an outlet 84. Preferably, vacuum chamber 74 defines a substantially void region 86 of sufficient capacity to allow water and waste to separate from the air. Vacuum chamber 74 further includes a top cover 88 having a clean-out port 90 sealably covered by a removable cap 92. Vacuum chamber 74 is coupled to vacuum source 72 via a vacuum conduit 94 which passes into void region 86 of vacuum chamber 74 through cover 88. Vacuum chamber 74 is coupled to vacuum head 76 via a suction conduit 96 which enters into void region 86 of vacuum chamber 74 through cover 88. Conduit 94 extends into an upper region of vacuum chamber 74. Conduit 96, however, extends downwardly from the cover 88 toward a lower region of vacuum chamber 74.

Figure 6:
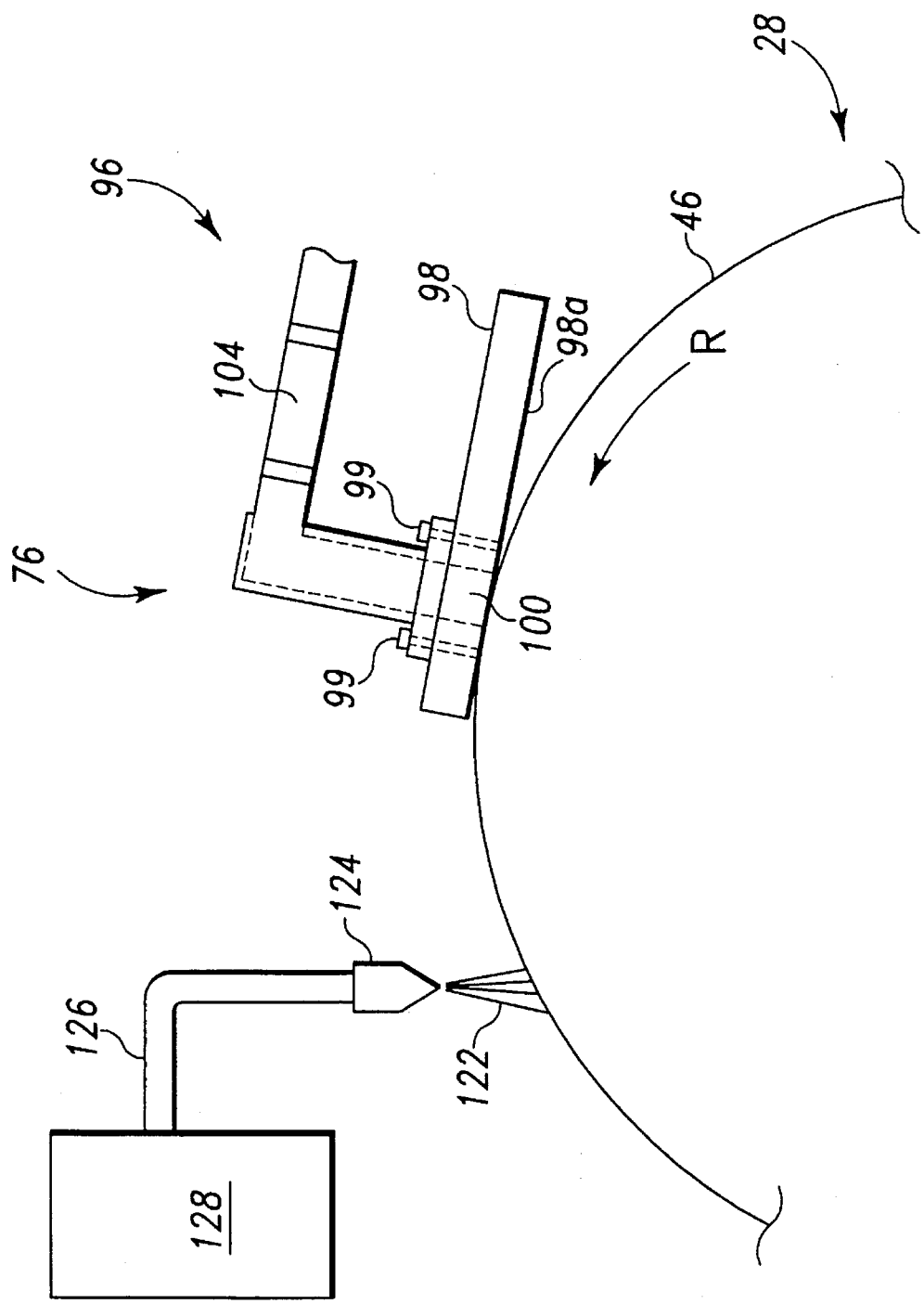
FIG. 6 shows a schematic side view of the vacuum head and water nozzle used in the filter cleaning apparatus shown in FIGS. 1 and 5.

Referring to FIGS. 1, 5 and 6, vacuum head 76 includes a hollow vacuum body 97 and a wear plate 98 which is held in contact with resilient filter screen 46 by a spring force applied by conduit 96. Hollow vacuum body 97 is coupled to wear plate 98, preferably by a plurality of plastic or nylon bolts 99, which will wear down as the wear surface 98a of wear plate 98 wears down due to friction between wear surface 98a and resilient filter screen 46 as filter drum 28 is rotated in the direction R. Preferably, vacuum body 97 is made of a transparent material such as, for example, a clear acrylic plastic, so that the suction removal of particulate from resilient filter screen 46 may be observed. Wear plate 98 of vacuum head 76 is preferably made from ultrahigh molecular weight plastic so as to provide a long-lasting wear surface 98a. Wear plate 98 includes a narrow elongated slot 100 through which particulates removed from filter screen 46 are drawn. Preferably, slot 100 is substantially equal in length to the width of filter screen 46 of rotatable filter drum 28, and slot 100 has a width of about one-quarter of an inch. Hollow vacuum body 97 and elongated slot 100 together define a vacuum passage which extends to conduit 96. Vacuum head 76 is positioned in relation to filter drum 28 so that wear surface 98a is tangent to filter screen 46 at slot 100. Preferably, conduit 96 includes a substantially rigid portion 102 and a flexible portion 104, with flexible portion 104 interfaced between vacuum head 76 and rigid portion 102 for applying the spring force to vacuum head 76 to hold wear surface 98a of wear plate 98 in continuous contact with the outer surface of resilient filter screen 46.

Referring to FIG. 5, sediment collection device 78 includes a conduit 108 extending vertically downward from opening 84 of vacuum chamber 74. A second conduit 110 is arranged substantially perpendicular to a lower end of conduit 108. Conduit 110 is coupled in a mid-region thereof to the lower end of conduit 108. A third conduit 112 is coupled at a lower end thereof to a left end of horizontal conduit 110. An upper end of third conduit 112 is sealably covered with a removable cap 114. A fourth conduit 116, which is substantially U-shaped, is coupled at one end to the right end of horizontal conduit 110. Conduit 116 extends upwardly a distance from horizontal conduit 110, bends, and then extends downwardly to form a drain outlet 118. Preferably, drain outlet 118 of U-shaped conduit 116 extends toward a sewer opening in a floor of a aquaculture building. The length which conduit 116 extends upwardly from horizontal conduit 110 determines the height of the water level which will be maintained in the vertical conduit 108. Since water is continually maintained in conduit 108 at a height determined by conduit 116, the water in conduit 108 serves as a check valve to prevent vacuum which is drawn by vacuum source 72 in vacuum chamber 74 from drawing air through drain outlet 118.

The operation of filter cleaning system 70 is as follows with reference to FIGS. 1, 5 and 6. Vacuum source 72 is energized to draw a vacuum in vacuum chamber 74 which, in turn, results in a suction at elongated slot 100 of vacuum head 76. Vacuum head 76, being in contact with resilient filter screen 46 of the rotatable drum filter 28, as shown in FIGS. 1 and 6, removes particulate and excess water which is on an outside surface of resilient filter screen 46 of rotating drum 28 at a location above the surface of the water in container 22 and transports the removed particulate and excess water into void 86 of vacuum chamber 74. The particulate and water removed from filter screen 46 are drawn by gravity downward and directed by frustoconical base 82 of vacuum chamber 74 to outlet 84 of vacuum chamber 74. The particulate matter then travels downwardly through outlet 84 and into vertical conduit 108, thereby forming sediment 120 on an inside surface of horizontal conduit 110 as shown in FIG. 5.

Particulate remaining in or on the mesh of filter screen 46 after passing vacuum head 76 is flushed from filter screen 46 by a stream of water 122 which is directed to the surface of filter screen 46 by a water nozzle 124 which generates a fan-shaped spray pattern of water of sufficient size and at sufficient pressure to dislodge the remaining particulate. Nozzle 124 is connected via water conduit 126 to a water source 128 which supplies either fresh or filtered water to nozzle 124 at sufficient pressure and volume to produce the desired spray pattern. The particulate removed from filter screen 46 by water stream 122 is transported thereby into the unfiltered water contained by container 22 for re-collection by filter screen 46.

To clean the internal surfaces of filter cleaning system 70, cap 92 is removed so that clean water may be introduced into cleaning port 90 of vacuum chamber 74 to flush any particulate in vacuum chamber 74 into the vertical conduit 108. Thereafter, cap 92 is reinstalled on cleaning port 90. Cap 114 is then removed from conduit 112 and a flow of water is introduced into conduit 112 to cause particulate matter which has settled in the horizontal conduit 110 to travel through U-shaped conduit 116 and exit from drain opening 118. Thereafter, cap 114 is reinstalled on conduit 112. This cleaning method may take place during the operation of aquaculture system 10 without effecting the operation of the filter cleaning system 70.

Although the invention has been described in terms of its application as part of an aquaculture system, it is contemplated that the invention is useful for purposes other than those associated with aquaculture, such as for example, harvesting zoo plankton and the like.

Although the present invention has been described with reference to preferred embodiments, workers skilled in the art will readily recognize that changes may be made in form and detail without departing from the spirit and scope of the following claims.

What is claimed is:

1. A substantially closed aquaculture system for farming fish in combination with a system for filtering water to be recirculated through said aquaculture system, comprising:

a container having an inlet for receiving water from the aquaculture system to be filtered and an outlet for recirculating filtered water to the aquaculture system;

a cylindrically shaped filter horizontally mounted in said container by a tubular member having an elongated opening formed therein for receiving a flow of filtered water, said elongated opening having a length of at least half an axial length of said cylindrically shaped filter, said filtered water flowing through said tubular member and flowing out of said tubular member from at least one end of said tubular member, said filter having a porous resilient filter screen forming an outer layer of said filter for removing aquaculture system particulate from said water received through said inlet, said elongated opening opposing said filter screen;

cleaning means positioned in direct contact with said resilient filter screen for removing said aquaculture system particulate collected at an outer surface of said resilient filter screen; and rotating means for rotating said filter.

2. The system of claim 1 wherein said filter comprises:

a rigid cylindrical frame having two substantially closed end portions and a substantially open porous circumferential portion extending between said end portions, said substantially closed end portions each having an opening along an axis extending through said cylindrical frame;

said tubular member extending through each said opening in each of said end portions for rotatably carrying said rigid cylindrical frame; and a porous flexible support layer positioned between said porous resilient screen and said substantially open porous circumferential portion of said cylindrical frame for allowing said resilient filter screen to flex at a location where said cleaning means contacts said outer surface of said filter screen.

3. The system of claim 1 wherein said porous resilient filter screen comprises a non-corroding material.

4. The system of claim 1 wherein said porous resilient filter screen is a screen having openings whose size is dependent upon the size of the particulate matter which is to be removed from the water.

5. The system of claim 2 wherein said cylindrical frame comprises a non-corroding material.

6. The system of claim 2 wherein said elongated opening of said tubular member faces a bottom of said container.

7. The system of claim 2 wherein said filter further comprises a plurality of polymeric bushings, one of said plurality of bushings being mounted to a corresponding end portion of said cylindrical frame, said bushings being in rotatable contact with an outer surface of said tubular member.

8. The system of claim 7 wherein said filter further comprises:

a plurality of pliable seals, wherein one of said plurality of pliable seals is positioned adjacent an outer surface of a corresponding one of said plurality of bushings; and retainer means, including a plurality of retainers wherein one of said plurality of retainers is positioned adjacent to a corresponding one of said seals, for applying pressure to each said seal to cause a deformation of said seal to form a sealing relationship between each said bushing and said retainer, said deformation of said seal further forming a sealing surface on said seal which is in sealing contact with said outer surface of said tubular member.

9. The system of claim 1 wherein said cleaning means comprises:

a vacuum source;

a container having an upper portion coupled to said vacuum source, and having a frustoconical base which extends toward an outlet;

a vacuum head coupled to said container via a suction conduit, said vacuum head being held in direct contact with said resilient filter screen by a spring force exerted on said head by said conduit; and sediment collection means coupled to said outlet of said container for collecting said removed particulate.

10. The system of claim 9 wherein said vacuum head comprises a hollow body coupled to a polymeric member having an elongated slot having a length substantially equal to a width of said resilient filter screen.

11. The system of claim 9 wherein said cleaning means further comprises a water nozzle for supplying a stream of water to said resilient filter screen to remove particulate therefrom not previously removed by said vacuum head.

12. A system for filtering water, comprising:

a container having an inlet for receiving water to be filtered and an outlet for supplying filtered water;

a filter rotatably carried in said container, said filter having a porous resilient filter screen forming an outer layer of said filter for removing particulate from said water received through said inlet;

rotating means for rotating said filter; and cleaning means positioned in direct contact with said resilient filter screen for removing particulate collected at an outer surface of said resilient filter screen, said cleaning means including a vacuum source, a container having an upper portion coupled to said vacuum source, and having a frustoconical base which extends toward an outlet, a vacuum head coupled to said container via a suction conduit, said vacuum head being held in direct contact with said resilient filter screen by a spring force exerted on said head by said conduit, and sediment collection means coupled to said outlet of said container for collecting said removed particulate, said sediment collection means including:

a first conduit coupled at a first end to said outlet in said base of said container;

a second conduit having a substantially horizontal portion coupled in a mid-region thereof to a second end of said first conduit, a substantial portion of said removed particulate settling in said second conduit;

a third conduit having a first end coupled to a first end of said second conduit, said third conduit extending upwardly from said second conduit to a second end of said third conduit, said second end of said third conduit being covered with a first removable cap; and a fourth conduit coupled to a second end of said second conduit and extending upwardly a distance therefrom, and then extending downwardly to form a drain outlet, wherein a water level in said first conduit is dependent upon the length of said distance.

13. The system of claim 12 wherein said upper portion of said container includes a cleaning port covered by a second removable cap.

14. The system of claim 1 wherein said rotating means comprises:

a motor having a rotatable shaft; and a drive wheel coupled to said shaft, said drive wheel being in driving contact with said outer surface of said resilient filter screen for transmitting a rotational force generated by said motor into a rotation of said filter.

15. The system of claim 1 wherein said substantially closed aquaculture system includes a holding tank.

\* \* \* \* \*